(12) United States Patent
Thomson et al.

(10) Patent No.: US 7,340,396 B2
(45) Date of Patent: Mar. 4, 2008

(54) METHOD AND APPARATUS FOR PROVIDING A SPEAKER ADAPTED SPEECH RECOGNITION MODEL SET

(75) Inventors: Mark Thomson, Sunnyvale, CA (US); Julien Epps, Kensington (AU); Trym Holter, Coogee (AU)

(73) Assignee: Motorola, Inc., Schaumburg, IL (US)

( * ) Notice: Subject to any disclaimer, the term of this patent is extended or adjusted under 35 U.S.C. 154(b) by 891 days.

(21) Appl. No.: 10/368,756

(22) Filed: Feb. 18, 2003

(65) Prior Publication Data

US 2004/0162728 A1   Aug. 19, 2004

(51) Int. Cl.
G10L 15/20 (2006.01)

(52) U.S. Cl. .................. 704/234; 704/250; 704/255
(58) Field of Classification Search ............. None
See application file for complete search history.

(56) References Cited

U.S. PATENT DOCUMENTS

| | | | |
|---|---|---|---|
| 5,864,810 A * | 1/1999 | Digalakis et al. | 704/255 |
| 6,073,096 A * | 6/2000 | Gao et al. | 704/245 |
| 6,799,162 B1 * | 9/2004 | Goronzy et al. | 704/244 |
| 6,915,259 B2 * | 7/2005 | Rigazio et al. | 704/244 |

OTHER PUBLICATIONS

"Unsupervised Speaker Adaptation Method Based On Hierarchical Spectral Clustering" from Proc. Int. Conf. On Acoustics, Speech and Signal Processing, 1989, pp. 286-289 by Sadaoki Furui.

* cited by examiner

Primary Examiner—Abul K. Azad (57) ABSTRACT

Speech feature vectors (10) are provided and utilized to develop a corresponding estimated speaker dependent speech feature space model (20) (in one embodiment, it is not necessary that this model (20) have defined correlations with the verbal content of the represented speech itself). A model alignment unit (21) then contrasts this model (20) against the contents of a speaker independent speech feature space model (24) to provide alignment indices to a transformation estimation unit (23). In one embodiment, these alignment indices are based, as least in part, upon a measure of the differences between likelihoods of occurrence for the elements that comprise the constituency of these models. The transformation estimation unit (23) utilizes these alignment indices to provide transformation parameters to a model transformation unit (25) that uses such parameters to transform a speaker independent speech recognition model set (26) and yield a resultant speaker adapted speech recognition model set (27).

24 Claims, 4 Drawing Sheets

METHOD AND APPARATUS FOR PROVIDING A SPEAKER ADAPTED SPEECH RECOGNITION MODEL SET

TECHNICAL FIELD

This invention relates generally to speech recognition and more particularly to the provision of speaker adapted speech recognition model sets.

BACKGROUND

Automatic speech recognition techniques are known that convert a speech signal into a sequence of speech feature vectors (and/or classes) and then identify segments of the sequence that correspond to specific words. The segmentation and recognition process typically relies on a set of speech recognition models (wherein typically each such model corresponds to a given sound, such as a specific word or sub-word unit). Again as well understood, each model can provide a basis for computing a likelihood that a particular set of speech feature values (or classes) are properly associated with a corresponding acoustic unit such as a given specific sound.

Such speech recognition models are often created during overall system development and are usually based on a large corpus of speech data from many speakers representing a given language (or dialect). During use, however, speech recognition accuracy depends on the ability of the models to provide accurate estimates of feature likelihoods for a given user's voice. Since the statistics of speech feature usage and occurrence in fact differ significantly as between various speakers of a given language, models trained on many speakers will usually not provide completely accurate likelihood estimates for any given individual user unless the permitted words are purposefully significantly limited and significantly audibly distinct from one another.

Known methods exist to adapt models during use to attempt to better represent the characteristics of a given individual speaker's voice. These methods tend to require, however, that the speech recognition system be able to correctly recognize a sufficient amount of the user's speech to provide reliable supervisory information for the adaptation process. Upon receiving a speech sample, these processes utilize speech recognition to ascertain the verbal content of the speech and then assigns that content to corresponding acoustic classes, models, and/or other classes such as phonemes (note that "acoustic classes" can include phonemes as such, but more typically also comprise more abstract categories for the most part, such as sub-phonemes or context dependent phonemes where the sound depends upon what precedes and/or what follows the sound). When the initial models are not sufficiently accurate, however, initial recognition performance will be poor and tend to significantly hamper the adaptation process.

At least one prior art suggestion has been made to attempt to avoid these problems by making modifications to vector quantization-based models through use of clustering the speaker's feature data. This suggestion proposes that speech recognition as based upon vector quantization codebooks might benefit from such an approach. Other specifics of this approach are described more completely further herein for the convenience of the reader. For the moment, it may be noted that this approach tends to require the storing of feature vectors while the intended clustering occurred, and only a simple vector distance is utilized to facilitate the alignment of speaker independent classes to speaker dependent classes. These processing requirements and relatively unsophisticated constituent elements may have contributed to the general lack of usage of such a technique in speech recognition today (although a general shift in the technology away from vector quantization methodology may factor into this situation as well).

BRIEF DESCRIPTION OF THE DRAWINGS

The above needs are at least partially met through provision of the method and apparatus for providing a speaker adapted speech recognition model set described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, both a speaker independent speech recognition model set (to be used when recognizing speech) and a speaker independent speech feature space model that is at least partially different from the speaker independent speech recognition model are provided. Speech from a given specific user then supports the provision of a corresponding speaker dependent speech feature space model. A set of alignment indices are then formed as a function, at least in part, of the speaker independent speech feature space model and the speaker dependent speech feature space model. These alignment indices then permit modification of the speaker independent speech recognition model to effect provision of a speaker adapted speech recognition model set for subsequent use during speech recognition activities.

In a preferred embodiment, the speaker independent speech feature space model comprises a speaker independent acoustic feature space model. In similar fashion, in a preferred approach, the speaker dependent speech feature space model can comprise a speaker dependent acoustic feature space model.

In a preferred embodiment, speech feature vectors are determined from the speech. These speech feature vectors provide at least an estimation of the speaker dependent speech feature space model. Such speech feature vectors can comprise, for example, cepstral parameters as well understood in the art.

The alignment indices can be determined, for example, by determining correspondences between speech feature classes of the speaker independent speech feature space model and the speaker dependent speech feature space model. For example, one can determine the alignment between the speech feature classes of the speaker independent speech feature space model and the speech feature classes of the speaker dependent speech feature space model. Further, one can ascertain when the alignments meet at least a first criteria such as a measure of a difference between likelihoods of occurrence for at least some of the speech features classes of the speaker independent speech feature space model and likelihoods of occurrence for at least some of the speech feature classes of the speaker independent speech feature space model. Such a measure of a difference could be, for example, a measure of a difference between a speech feature class n-gram probability for the speaker independent speech feature space model and a speech feature class n-gram probability for the speaker dependent speech feature space model.

Referring now to the drawings, it will be helpful to first describe a prior art approach of interest. The prior art platform shown in FIG. 1 comprises a speech recognition platform as follows.

Figure 1:
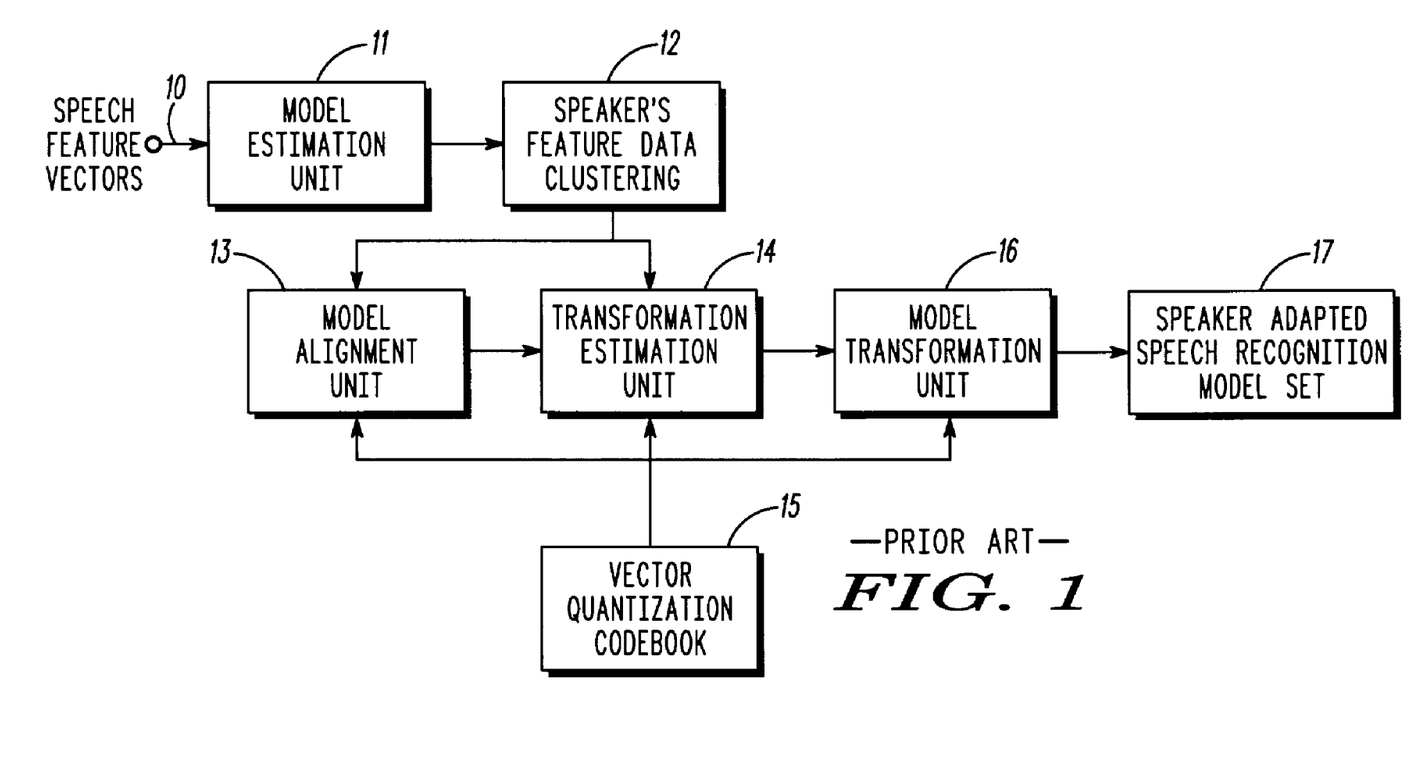
FIG. 1 comprises a block diagram depiction of a prior art platform.

This prior art platform provides for both the clustering of a speaker's feature data 12 and a vector quantization codebook 15 (the former typically being speaker dependent and the latter typically being speaker independent). Speech feature vectors 10 representing a given speech input for a given speaker are provided to a model estimation unit 11 which in turn feeds the speaker's feature data clustering activity 12. In general, for each level of a speaker model tree, and beginning with the root node of the speaker model tree, each vector quantization codebook element is associated with the nearest cluster centroid in the speaker model. The average deviation for each cluster then serves as a bias estimate to permit adjustment of the vector quantization elements associated with that cluster. In particular, a model alignment unit 13 uses the information from the clustering process 12 and the vector quantization codebook 15 to determine these bias estimates. A transformation estimation unit 14 then utilizes this information to provide transformation parameters that are used by a model transformation unit 16 to provide a resultant speaker dependent speech recognition model set 17 based upon a transformed and modified vector quantization codebook. (Additional information regarding this approach can be found at Furui, Proceedings of the International Conference on Acoustics, Speech and Signal Processing, pages 286-289 (1989), the contents of which are hereby incorporated by this reference.)

This prior art approach requires the storage of feature vector information while facilitating the clustering process. Perhaps more significantly, this approach uses a simple vector distance measurement to effect its overall approach. While perhaps appropriate and/or somewhat intuitive when applied in the context of vector quantization-based speech recognition platforms, such an approach does not apply with relevance to more modern model-based speech recognition techniques.

Figure 2:
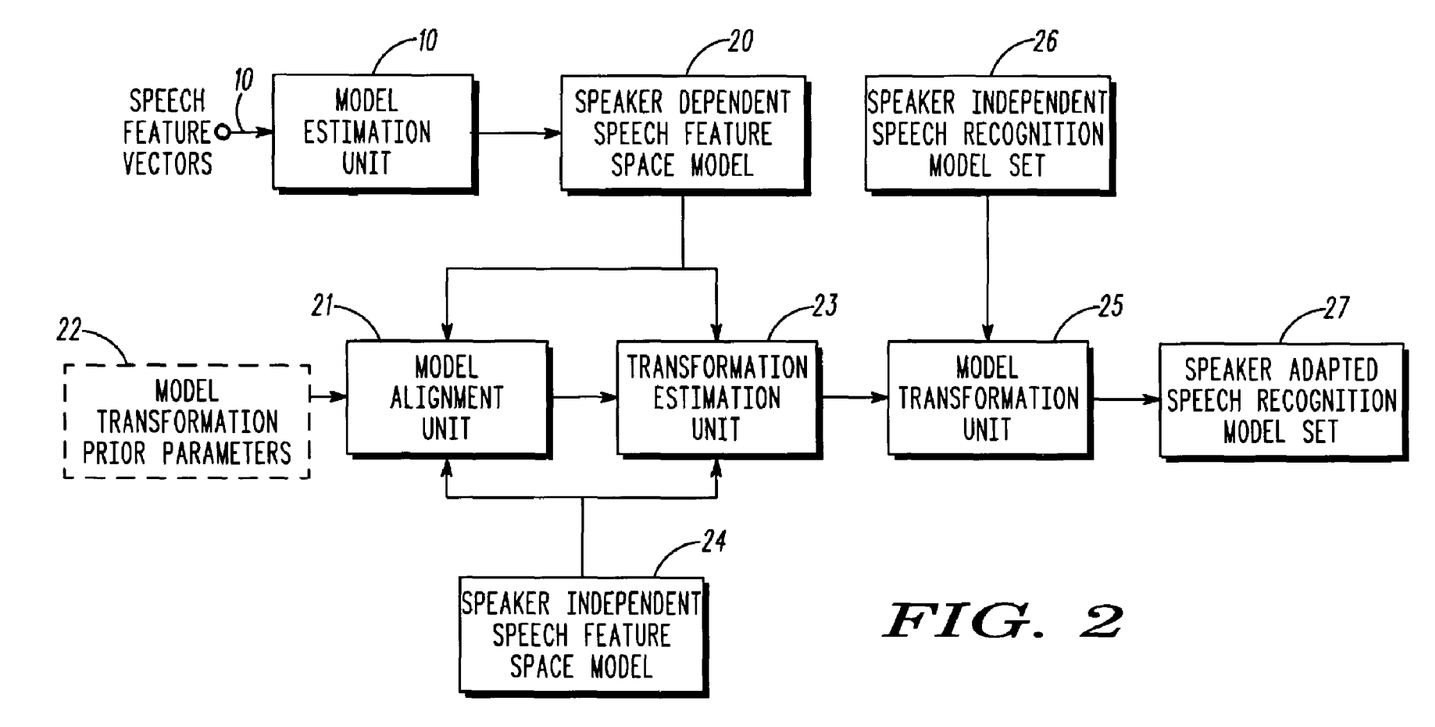
FIG. 2 comprises a block diagram as configured in accordance with an embodiment of the invention.

Referring now to FIG. 2, an embodiment of a platform suitable to support a preferred approach will be described. This platform serves generally to provide a way of adapting a model to an individual speaker without having to perform speech recognition as an integral part of the modification process. While these described processes do require some sufficient quanta of a user's speech, there are no constraints with respect to the content of that speech. Therefore, the user's speech samples do not need to comprise specialized training material or the like (though, if desired, such content would also suffice for these purposes).

A sequence of speech feature vectors 10 are extracted from such speech samples in accordance with well understood prior art technique and provided to a model estimation unit 11. The latter uses these speech feature vectors 10 to then estimate a corresponding speaker dependent speech feature space model 20 (which may comprise, in a preferred embodiment, an estimated speaker dependent acoustic feature space model). This model 20 comprises a representation of the statistics of the speech features and may comprise, in a preferred embodiment, the following elements:

A set of acoustic classes, $c_i$, i=1 . . . N, typically corresponding to phonemes, each represented by statistics that include a mean feature vector value, and optionally other distribution parameters such as feature covariance matrices. Such classes and their statistics can be determined using a procedure described below.

Prior probabilities $p(c_i)$ for each class; and

N-gram class probabilities, $p(c_{i_t}|c_{i_{t-1}})$, $p(c_{i_t}|c_{i_{t-1}}c_{i_{t-2}})$, $p(c_{i_t}|c_{i_{t-1}}c_{i_{t-2}}c_{i_{t-3}})$ and so forth, where $c_{i_t}$ represents a hypothesized class occurring at time sample t.

A model alignment unit 21 receives the resultant information corresponding to the speaker dependent speech feature space model 20 and compares for correspondence between the classes for the speaker dependent speech feature space model 20 and the classes of a predetermined speaker independent speech feature space model 24. Such correspondence, in a preferred approach, derives from searching all the possible combinations of class associations to find an alignment that optimizes a predetermined criterion (if desired, and likely pursuant to some pre-processing filtering, a smaller subset than all possible combinations of class associations could possibly suffice in some settings). In one preferred approach, the predetermined criteria has three components: (1) a measure of the distance between the class prior probabilities of the two models (with this measure reflecting the typical situation with most languages where some sounds (such as "aa" in English) are more likely to occur than other sounds (such as "zzz" in English)); (2) a measure of the distance between the class n-gram probabilities of the two models; and (3) a measure of the likelihood of the speaker dependent model based on the speaker independent model. Optionally, the model alignment unit 21 can be aided by a set of model tranformation prior parameters 22. Such model transformation prior parameters would describe prior distributions for transformation functions that map the speaker dependent feature space model onto the speaker independent feature space model.

Viewed overall, the model alignment unit 21 responds to the speaker dependent acoustic feature space model information and the speaker independent acoustic feature space model information and provides an output comprising model alignment indices that correspond to differences between speaker dependent feature space models and speaker independent feature space models that correspond to one another as a function, at least in part, of a probability of occurrence of each such model. In a preferred approach, these alignment indices correspond to differences between speaker dependent feature space models and speaker independent feature space models that further correspond to one another as a function, at least in part, of n-gram probability information for classes that comprise each of the speaker dependent and speaker independent feature space models.

A transformation estimation unit 23 receives the alignment indices from the model alignment unit 21 and determines a transformation that, in a preferred embodiment, maps the arithmetic means of the speaker independent feature model classes onto the arithmetic means of the corresponding speaker feature model classes. When the classes are represented by just mean vectors, the transformation comprises a piecewise transformation estimated by maximum likelihood. The piecewise components of the transformation are preferably organized in a hierarchical tree. If in a given embodiment the classes are represented by more detailed distribution information, then more sophisticated transformations can of course be estimated.

A model transformation unit 25 has access to one or more speaker independent speech recognition model sets 26. In a preferred embodiment, these speaker independent speech recognition model sets 26 are at least partially different from the speaker independent speech feature space model 24 referred to earlier, and also preferably comprise a set of hidden Markov models (HMMs). The model transformation unit 25 receives the transformation parameters from the transformation estimation unit 23 and applies this transformation information to the HMMs. More particularly, each class within the speech feature space models is preferably associated with a subset of the probability density functions (pdfs) for the set of hidden Markov models, and the model transformation unit 25 applies the transformations to the corresponding HMM pdfs.

So configured, the model transformation unit 25 provides as an output a speaker adapted speech recognition model set 27 that comprises the speaker independent speech recognition model set 26 as transformed to better align with pertinent characteristics of a given speaker's speaking tendencies.

In a preferred embodiment, the model estimation unit 11 can be configured to process the incoming feature vector information in such as way as to avoid the need to store a considerable quantity of these feature vectors. For example, a first received feature vector can be used as an initial estimate of a first acoustic class. Subsequent vectors whose distance from the mean falls below a predefined threshold can then be used to update the mean information by computing a linear combination of the old mean and the new vector. Subsequent vectors whose distance from all existing means exceeds the same (or another) threshold can be used to form a new initial estimate of the mean of a new class. This process can continue, for example, until the number of classes reaches a predefined level. The number of classes can then be delimited down to some desired N classes by eliminating those classes whose frequency of appearance are low relative to the likelihood of their means conditioned on other classes with larger frequencies. Once the class estimation process has converged, prior and n-gram frequencies can be readily estimated based on the classification of subsequent vectors.

Again, the feature vectors themselves need not correspond to any particular speech content or training text. These processes can be readily carried out successfully based upon whatever utterances are offered by a given individual during, for example, an ordinary conversation.

Figure 3:
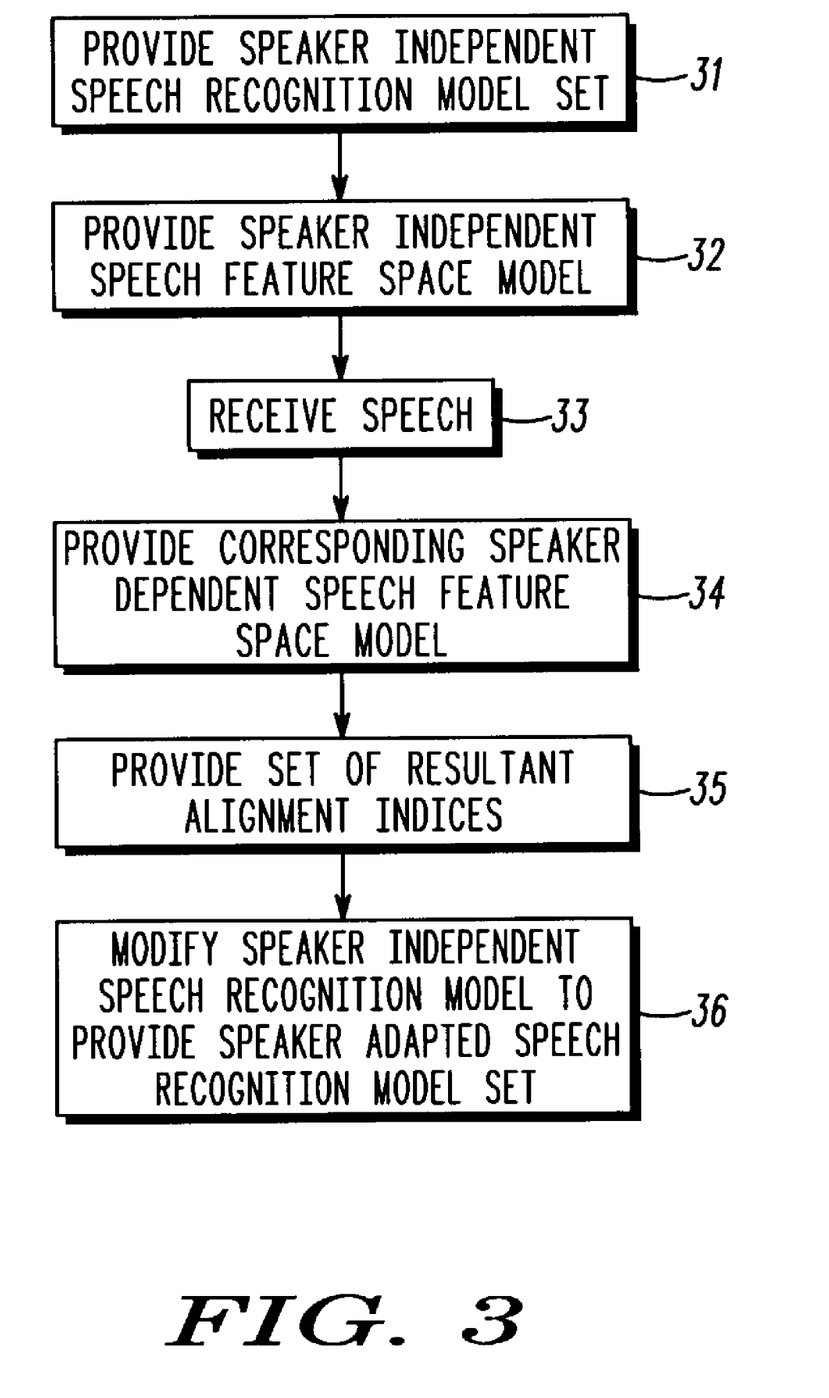
FIG. 3 comprises a general flow diagram as configured in accordance with an embodiment of the invention.

Referring now to FIG. 3, the platform as described above or any other suitable mechanism or combination of mechanisms serves to provide 31 a speaker independent speech recognition model set, which model set comprises a model set that is otherwise likely used during ordinary automatic speaker independent speech recognition purposes. The process also provides 32 another speaker independent speech feature space model. The latter model, although also speaker independent, is preferably different from the first speaker independent speech recognition model set provided 31 above. For example, in a preferred embodiment, the speaker independent speech feature space model will typically contain far fewer acoustic classes than the speaker independent speech recognition model set. This tends to ensure a more robust process of aligning the speaker independent speech feature space model and the speaker dependent feature space model.

Figure 4:
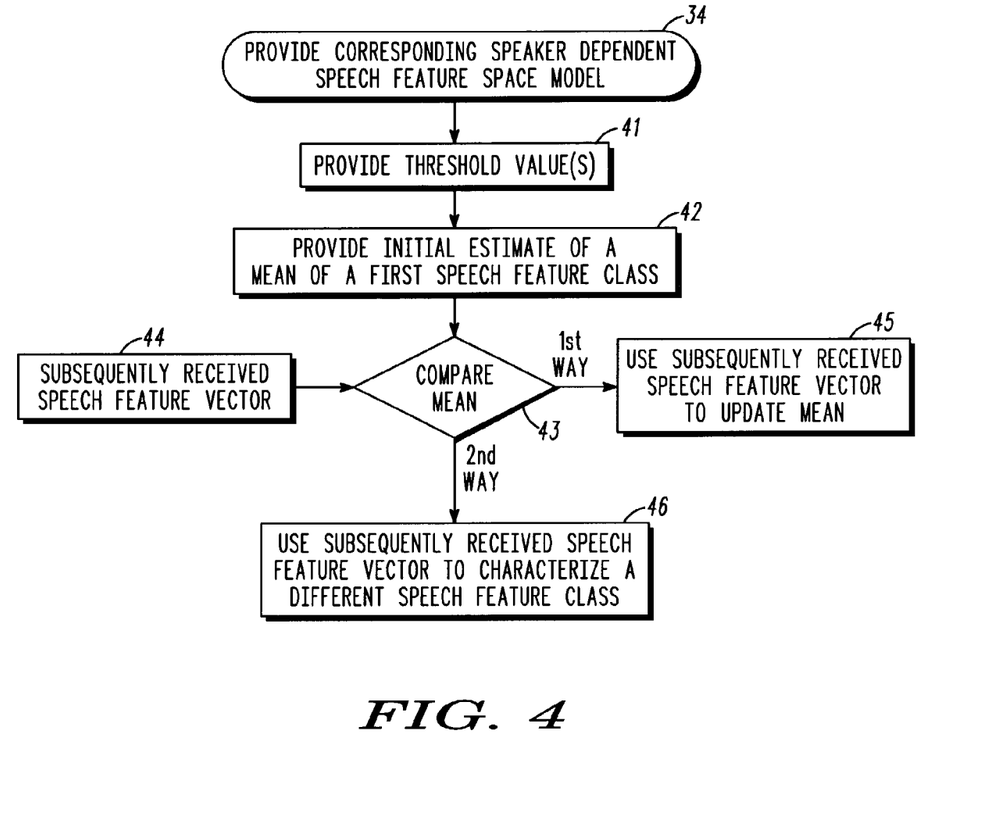
FIG. 4 comprises a detail flow diagram as configured in accordance with an embodiment of the invention.

Upon receiving 33 speech from a given user, the speech feature vectors that correspond to that speech are used to provide 34 a corresponding estimated speaker dependent speech feature space model. Referring momentarily to FIG. 4, one preferred approach to providing such a corresponding speaker dependent speech feature space model 34 includes providing 41 one or more threshold values and using 42 an initially received speech feature vector as an initial estimate of a mean of a first speech feature class. Subsequently received speech feature vectors 44 are then compared 43 with this mean. When the distance from the mean is below a first predetermined threshold as provided earlier, that vector information is used 45 in a first way to update the mean. When the distance from the mean is greater than the mean by more than a second predetermined threshold (which second predetermined threshold may be the same as, or different than, the first predetermined threshold as appropriate to a given application), that vector information is used 46 in a second way; i.e., to characterize a different speech feature class. As noted earlier, this iterative process can be utilized until, for example, the number of classes reaches a predefined level.

Returning to FIG. 3, and following provision 34 of the corresponding speaker dependent speech feature space model, the process provides 35 a corresponding set of resultant alignment indices. Again, these alignment indices are determined as a function, at least in part, of a likelihood that a given speaker dependent speech feature space model will occur; i.e. the probability of a given speaker dependent speech feature space model actually occurring within a given speech sample.

The alignment indices are then used to modify 36 the speaker independent speech recognition model to provide a resultant speaker adapted speech recognition model set. Unlike many other prior art approaches that require actual recognition of the verbal content of a given speech sample, these processes will function with or without such knowledge. Here, the process collects user data (the verbal content of which may, or may not, be recognizable to the platform) and forms clusters based on the data itself and make corresponding classifications of use when altering pre-defined models to effect the adaptation.

To illustrate, consider a very simple example dealing with a fictious language having only two main sounds—oo and ah. The platform would likely begin with a speaker independent model that represents these two sounds using two models. There are, however, typically many subtly different ways to articulate two sounds such as these, and the speaker independent model will typically not match exactly the specific tendencies of articulation of a given speaker. Pursuant to these various embodiments, one or more samples of the user speaking are collected and the appropriate feature vectors extracted and analyzed. Such analysis will likely reveal, in this example, that the speaker tends to utter sounds that fall roughly into either of two identified classes. Without actually assigning such sounds to such classes (which may entail making a decision regarding the verbal content being expressed by the speaker in these samples), these embodiments effect a comparison of the two classes with the information provided regarding independent speaker-based classes. Based upon this comparison, the process can correlate or otherwise match up the two classes as between the developed set of classes and the classes of the speaker independent speech feature space model and use the resultant identified differences to adjust the speaker independent speech recognition model set 26 as will be used by the platform when effecting automated speech recognition.

Such embodiments are suitable for use during a training period with or without specific training content and/or for use on the fly during ordinary use. The developed information can be used on a one-time basis and then discarded, or kept for future use. It should also be noted that these processes provide useful results even when the speech sample(s) of the speaker do not include content that corresponds to all possible classes for a given spoken language. Even a relatively small amount of data that corresponds, strictly speaking, to only a few of the potential classes of a given language can be used to compute a relatively simple transformation that will nevertheless often prove beneficial.

Such embodiments can be realized using any appropriate platform, including discrete logic elements, a wholly integrated processing platform, distributed processing, and so forth. Such embodiments are also particularly appropriate for application in a device such as a wireless voice communications device, as the platform would have ready and relatively transparent access to samples of the speakers utterances during normal conversations.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
providing a speaker independent speech recognition model set to be used when recognizing speech;
providing a speaker independent speech feature space model that is at least partially different from the speaker independent speech recognition model;
receiving speech from a particular speaker;
using the speech to provide a corresponding speaker dependent speech feature space model;
using the speaker independent speech feature space model and the speaker dependent speech feature space model to provide at least one resultant set of alignment indices;
using the at least one resultant set of alignment indices to modify the speaker independent speech recognition model to provide a speaker adapted speech recognition model set.

2. The method of claim 1 wherein providing a speaker independent speech feature space model includes providing a speaker independent acoustic feature space model.

3. The method of claim 1 wherein providing a corresponding speaker dependent speech feature space model includes providing a corresponding speaker dependent acoustic feature space model.

4. The method of claim 1 wherein using the speech to provide a corresponding speaker dependent speech feature space model includes using the speech to determine speech feature vectors that are used to at least estimate the speaker dependent speech feature space model.

5. The method of claim 1 wherein using the speaker independent speech feature space model and the speaker dependent speech feature space model to provide at least one resultant set of alignment indices includes determining correspondences between speech feature classes of the speaker independent speech feature space model and the speaker dependent speech feature space model.

6. The method of claim 1 wherein using the speaker independent speech feature space model and the speaker dependent speech feature space model to provide at least one resultant set of alignment indices includes determining at least one mean for the speaker dependent speech feature space model.

7. The method of claim 6 wherein using the at least one resultant set of alignment indices to modify the speaker independent speech recognition model to provide a speaker adapted speech recognition model set includes using the at least one mean to modify at least one corresponding mean for the speaker independent speech recognition model.

8. A method, comprising:
providing a speaker independent speech recognition model set to be used when recognizing speech;
providing a speaker independent speech feature space model that is at least partially different from the speaker independent speech recognition model;
receiving speech from a particular speaker;
using the speech to provide a corresponding speaker dependent speech feature space model;
using the speaker independent speech feature space model and the speaker dependent speech feature space model to provide at least one resultant set of alignment indices;
using the at least one resultant set of alignment indices to modify the speaker independent speech recognition model to provide a speaker adapted speech recognition model set;
providing at least one threshold value;
using an initially received speech feature vector as an initial estimate of a mean of a first speech feature class;
comparing a subsequently received speech feature vector with the mean to provide a comparison result;
when the comparison result corresponds to the at least one threshold value in a first way, using the subsequently received speech feature vector to update the mean for the first speech feature class;
when the comparison results corresponds to the at least one threshold value in a second way, which second way is different from the first way, using the subsequently received speech feature vector to characterize a different speech feature class.

9. The method of claim 5 wherein using the speaker independent speech feature space model and the speaker dependent speech feature space model to provide at least one resultant set of alignment indices further includes determining an alignment between the speech feature classes of the speaker independent speech feature space model and the speech feature classes of the speaker dependent speech feature space model, which alignment meets at least a first criteria.

10. The method of claim 9 wherein the first criteria includes a measure of a difference between likelihoods of occurrence for at least some of the speech feature classes of the speaker independent speech feature space model and likelihoods of occurrence for at least some of the speech feature classes of the speaker independent speech feature space model.

11. The method of claim 10 wherein the measure of a difference comprises a measure of a difference between a speech feature class n-gram probability for the speaker independent speech feature space model and a speech feature class n-gram probability for the speaker dependent speech feature space model.

12. A method comprising:
providing a speaker independent speech recognition model set to be used when recognizing speech;
providing a speaker independent speech feature space model;
receiving speech from a particular speaker;
using the speech to provide a corresponding speaker dependent speech feature space model;
using the speaker independent speech feature space model and the speaker dependent speech feature space model to provide at least one resultant set of alignment indices as a function, at least in part, of a likelihood that a given speaker dependent speech feature space model will occur;
using the at least one resultant set of alignment indices to modify the speaker independent speech recognition model to provide a speaker adapted speech recognition model set.

13. The method of claim 12 wherein providing a speaker independent speech feature space model includes providing a speaker independent acoustic feature space model.

14. The method of claim 12 wherein providing a corresponding speaker dependent speech feature space model includes providing a corresponding speaker dependent acoustic feature space model.

15. The method of claim 12 wherein using the speech to provide a corresponding speaker dependent speech feature space model includes using the speech to determine speech feature vectors that are used to at least estimate the speaker dependent speech feature space model.

16. The method of claim 12 wherein using the speaker independent speech feature space model and the speaker dependent speech feature space model to provide at least one resultant set of alignment indices as a function, at least in part, of a likelihood that a given speaker dependent speech feature space model will occur further includes determining an alignment between the speech feature classes of the speaker independent speech feature space model and the speech feature classes of the speaker dependent speech feature space model, which alignment meets at least a first criteria.

17. The method of claim 16 wherein the first criteria includes a measure of a difference between likelihoods of occurrence for at least some of the speech feature classes of the speaker independent speech feature space model and likelihoods of occurrence for at least some of the speech feature classes of the speaker independent speech feature space model.

18. The method of claim 17 wherein the measure of a differences comprises a measure of a difference between a speech feature class n-gram probability for the speaker independent speech feature space model and a speech feature class n-gram probability for the speaker dependent speech feature space model.

19. A method comprising:
providing a speaker independent speech recognition model set to be used when recognizing speech;
providing a speaker independent speech feature space model;
receiving speech from a particular speaker;
using the speech to provide a corresponding speaker dependent speech feature space model;
using the speaker independent speech feature space model and the speaker dependent speech feature space model to provide at least one resultant set of alignment indices as a function, at least in part, of a likelihood that a given speaker dependent speech feature space model will occur;
using the at least one resultant set of alignment indices to modify the speaker independent speech recognition model to provide a speaker adapted speech recognition model set;
wherein using the speech to provide a corresponding speaker dependent speech feature space model includes:
providing at least one threshold value;
using an initially received speech feature vector as an initial estimate of a mean of a first speech feature class;
comparing a subsequently received speech feature vector with the mean to provide a comparison result;
when the comparison result corresponds to the at least one threshold value in a first way, using the subsequently received speech feature vector to update the mean for the first speech feature class;
when the comparison results corresponds to the at least one threshold value in a second way, which second way is different from the first way, using the subsequently received speech feature vector to characterize a different speech feature class.

20. The method of claim 12 wherein using the speaker independent speech feature space model and the speaker dependent speech feature space model to provide at least one resultant set of alignment indices includes determining at least one mean for the speaker dependent speech feature space model.

21. The method of claim 20 wherein using the at least one resultant set of alignment indices to modify the speaker independent speech recognition model to provide a speaker adapted speech recognition model set includes using the at least one mean to modify at least one corresponding mean for the speaker independent speech recognition model.

22. An apparatus comprising:
a speech feature vector input;
a speaker dependent speech feature space model estimation unit that is operably coupled to the speech feature vector input and having an output providing speaker dependent acoustic feature space model information;
speaker independent acoustic feature space model information;
a speech feature model alignment unit responsive to the speaker dependent acoustic feature space model information and the speaker independent acoustic feature space model information and having an output providing model alignment indices that correspond to differences between speaker dependent feature space models and speaker independent feature space models that correspond to one another as a function, at least in part, of a probability of occurrence of each such model;
a transformation estimation unit responsive to the model alignment indices and having an output providing model transformation parameters;
a model transformation unit responsive to the model transformation parameters and to a speaker independent speech recognition model set and having an output providing a speaker adapted speech recognition model set.

23. The apparatus of claim 22 wherein the speaker independent acoustic feature space model information differs in at least some respect from the speaker independent speech recognition model set.

24. The apparatus of claim 22 wherein the output of the speech feature space model alignment unit provides model alignment indices that correspond to differences between speaker dependent feature space models and speaker independent feature space models that further correspond to one another as a function, at least in part, of n-gram probability information for classes that comprise each of the speaker dependent and speaker independent feature space models.

* * * * *